United States Patent [19]

Duftschmid et al.

[11] Patent Number: 5,258,926
[45] Date of Patent: Nov. 2, 1993

[54] METHOD OF MEASURING RADIATION FOR A RADIATION MEASURING DEVICE

[75] Inventors: Klaus E. Duftschmid, Gumpoldskirchen; Bock Norbert, Haugsdorf; Klosch Wolfgang, Vienna, all of Austria

[73] Assignee: Osterreichesches Forschungszentrum Seibersdorf GmbH, Vienna, Austria

[21] Appl. No.: 651,396

[22] PCT Filed: Aug. 8, 1988

[86] PCT No.: PCT/EP88/00709

§ 371 Date: Apr. 3, 1991

§ 102(e) Date: Apr. 3, 1991

[87] PCT Pub. No.: WO90/01709

PCT Pub. Date: Feb. 22, 1990

[51] Int. Cl.$^5$ .................................................. G01T 1/18
[52] U.S. Cl. .................................................. 364/527
[58] Field of Search ............... 364/527, 573, 575, 577; 250/374, 375, 386

[56] References Cited

U.S. PATENT DOCUMENTS

| | | | |
|---|---|---|---|
| 4,320,387 | 3/1982 | Powell | 250/374 |
| 4,555,640 | 11/1985 | Bonnet et al. | 200/385 |
| 4,596,932 | 6/1986 | Buffa et al. | 250/385 |
| 4,596,933 | 6/1986 | Waechter et al. | 250/374 |
| 4,605,859 | 8/1986 | DiIanni et al. | 250/385 |
| 4,631,411 | 12/1986 | Noback | 250/385 |
| 4,672,544 | 6/1987 | Chizallet et al. | 250/374 |
| 4,684,806 | 8/1987 | Mitropanov | 250/375 |
| 4,718,110 | 1/1988 | Schaefer | 250/375 |
| 4,721,857 | 1/1988 | Kronenberg | 250/375 |
| 4,725,735 | 2/1988 | Ariel et al. | 250/385 |

FOREIGN PATENT DOCUMENTS 1066433 11/1979 Canada.
0151880 8/1985 European Pat. Off.

OTHER PUBLICATIONS

"Radiation Detection Algorithm for a Portable Survey Instrument," IEEE Transactions on Nuclear Science, vol. NS-34, No. 1, of Feb. 1987, pp. 619–621.

Primary Examiner—Jack B. Harvey
Assistant Examiner—Ellis B. Ramirez
Attorney, Agent, or Firm—Sandler Greenblum & Bernstein

[57] ABSTRACT

A method of measuring radiation for a radiation measurement device with at least two Geiger-Müller counter tubes of different sensitivity. A high voltage supply is in connection with each of the Geiger-Müller counter tubes and pulse shaping devices are connected to the Geiger-Müller tubes to generate output signals based on the intensity of radiation. A high-speed counter is coupled to the pulse shaping devices A microprocessor includes program storage and random access memory and is capable of switching between the Geiger-Müller tubes based on the radiation intensity. Information generated by the high-speed counter and the microprocessor is visually displayed. At least one Geiger-Müller counter tube generates pulses wherein an actual integration interval is determined by a measurement algorithm. Stable and accurate readings are made at low radiation intensity while providing quick response to significant changes in radiation intensity.

4 Claims, 4 Drawing Sheets

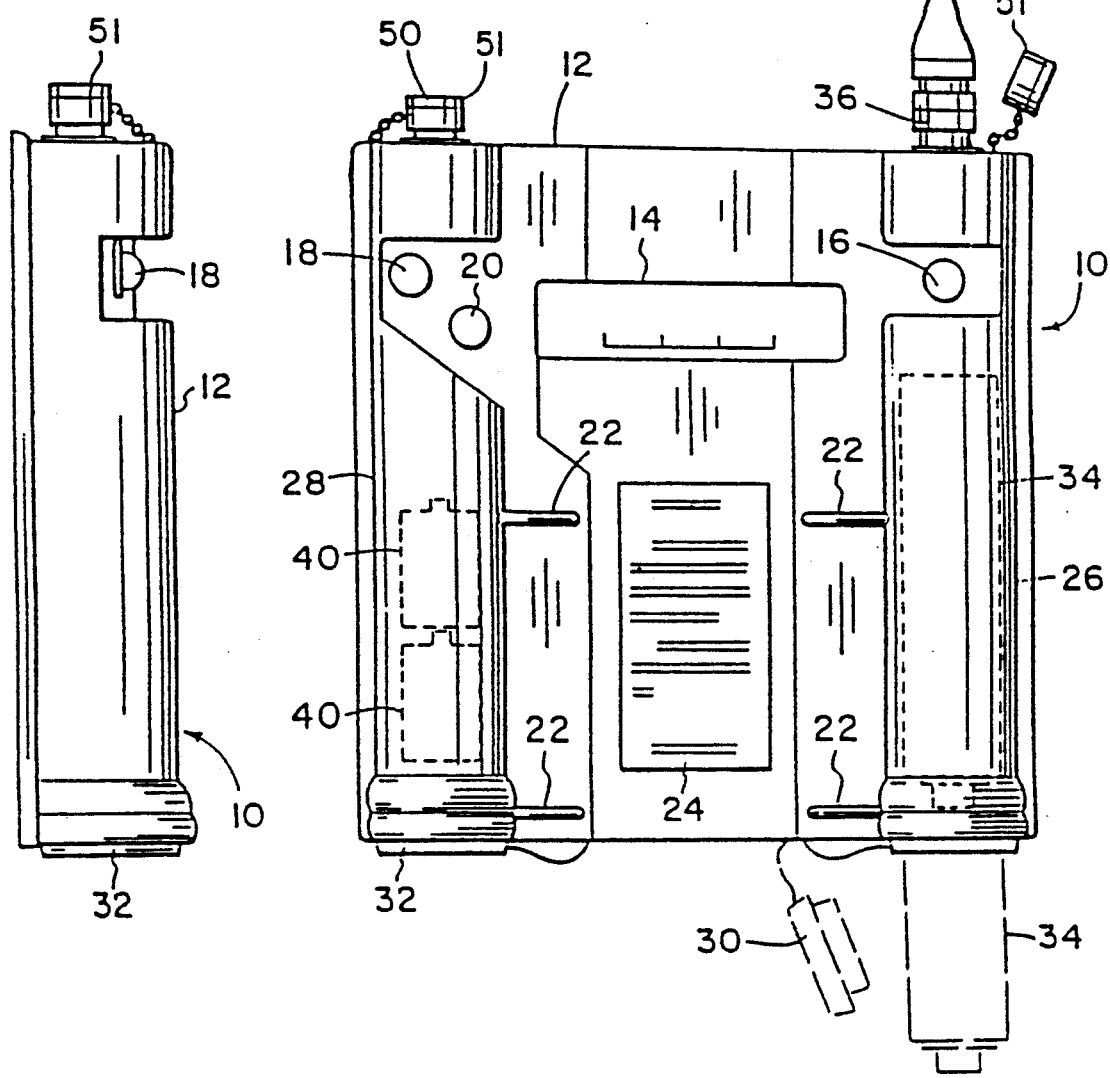

METHOD OF MEASURING RADIATION FOR A RADIATION MEASURING DEVICE

BACKGROUND OF THE INVENTION

1. Field of the Invention

The present invention relates to a method of measuring radiation for a radiation measurement device with at least two Geiger-Müller counter tubes of different sensitivity, high voltage supply means in connection with each of said Geiger-Müller counter tubes and microprocessor means including program storage means and random access memory means capable of switching between said Geiger-Müller tubes based on said radiation intensity whereby at least one Geiger-Müller counter tube generates pulses wherein an actual integration interval is determined by a measurement algorithm.

2. Description of Prior Art

Various radiation measuring devices, both stationary and portable, are known, including those employing a Geiger-Müller counter. In Geiger-Müller counters, a gas filled chamber is employed in which is incorporated two electrodes. The ionization produced by radiation dissipates part of all of its energy by generating electron ion pairs. A count is registered each time a pulse of voltage exceeds a minimum value established. European Patent Publication No. 0 151 880 refers to a particular radiation detector using Geiger-Müller tubes, in which instead of counting radiation pulses the elapsed time interval to the incident of the first strike is determined. This is done to avoid negative influences of dead time and thus to provide a linear read-out. Furthermore, this document discloses the possibility of switching between two different detectors based on the radiation intensity. IEEE Transactions on Nuclear Science, Vol. NS-34, No. 1, Feb. 1987 (New York, NY, U.S.A); H. C. Staley et al.: "Radiation Detection Algorithm for a Portable Survey Instrument", pp. 619 –621, discloses detectors counting impulses over a predetermined time interval.

Heretofore, different measurement instrument devices were required for different types of radiation and different intensity levels. For example, a device for measuring low level environmental background radiation would not be suitable for measuring high dose rates.

SUMMARY OF THE INVENTION

It is a principal object and purpose of the present invention to provide an accurate method of measuring radiation with a radiation measurement device which covers an extremely wide operating range utilizing two Geiger-Müller tubes with a central microprocessor which automatically switches between the two.

According to the invention, the aforementioned method comprises setting the actual integration interval to the value of the previous integration interval or to a fixed value at start up; retrieving a check interval from the actual integration interval, by taking the square root of the actual integration interval and adding a constant; calculating the average of the Geiger-Müller counter pulses for the check interval of time; selecting a specific measuring range and specific values for parameters of the algorithm according to the average, said values being the upper and the lower limit for the actual integration interval and the upper and lower limit for the allowed statistical fluctuation of the radiation intensity in said measuring range; comparing the actual integration interval to the upper limit; determining whether the actual integration interval falls below or above the upper limit for the actual integration interval; setting the integration interval to the upper limit if it was above the limit and letting the integration interval remain unchanged if it was less than or equal to the limit; calculating the average value of the counted Geiger-Müller pulses during the actual integration interval; determining a tolerance band by weighting said average value with the given values of the upper and lower limit of the statistical fluctuation; using the average value of the counter pulses for calculation of the dose rate if the average falls within said tolerance band and incrementing the actual integration interval or shortening the actual integration interval if the average falls outside the tolerance band and using said shortened integration interval for calculation of the dose rate value by comparing the actual integration interval against twice the lower limit for the actual integration interval so that if the actual integration interval is greater than twice the lower limit for the actual integration interval, it is decreased by the lower limit for the actual integration interval and if the actual integration interval is between a fixed minimum value and twice its lower limit, the actual integration interval is decreased by its square root, so that the average value of count rates may be calculated. This method ensures accurately measured values and a quick response.

A preferred method comprises that the internal tables for minimum and maximum integration time, threshold setting and short check interval are continuously updated every second. This method ensures accurately measured values and a quick response.

A preferred method comprises that the internal tables for minimum and maximum integration time, threshold setting and short check interval are continuously updated every second. Further, it is preferred that specific values are assigned to the parameters, the upper and lower limit of the actual integration interval, as well as the f+ and f−, the limits of statistical fluctuation for steady state operation in the particular dose rate range, wherein these parameters are selected from tables which are programmed in unchanging storage means.

BRIEF DESCRIPTION OF THE DRAWINGS

FIG. 1 is a front view of a radiation measurement device, constructed in accordance with the present invention;

FIG. 2 is a right side view of a radiation measurement device as shown in FIG. 1;

FIG. 3 is a bottom view of a radiation measurement device as shown in FIG. 1;

DETAILED DESCRIPTION OF PREFERRED EMBODIMENTS

Figure 4:
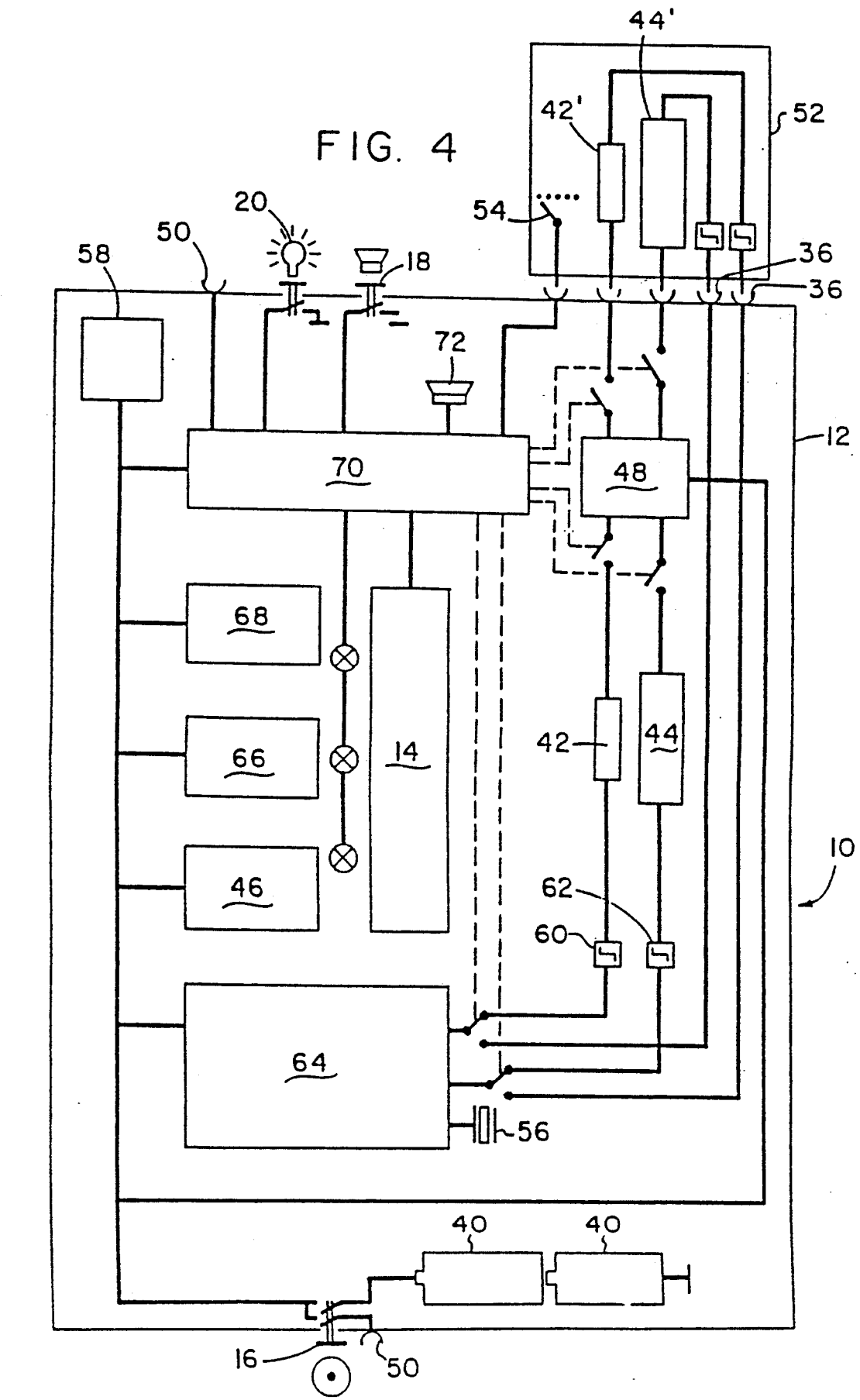
FIG. 4 is a block diagram of a radiation measurement device constructed in accordance with the present invention as shown in FIG. 1.

Referring to the drawings in detail, FIG. 1 shows a front view of a portable radiation measurement device 10 constructed in accordance with the present invention. The device 10 is housed in a rugged case 12 protecting it against environmental hazards. As will be described herein, the device may be used as a portable or stationary system.

All of the controls are located on the front side of the case 12 including a digital and analog visual liquid crystal display 14. An on-off switch 16 controls power to the device. A push button switch 18 controls an acoustic pulse signaling and acoustic alarm threshold feature to be described in detail. A push button switch 20 is provided to activate the display illumination. The on-off switch 16 and push button switches 18 and 20 are easily operated while the user (not shown) is wearing gloves.

A series of hooks 22 will accommodate a carrier belt (not shown) to be worn by the operator, allowing freedom of the operator's hands while ensuring optimum visibility of the display 14 and controls. An abbreviated set of operator instructions 24 are affixed to the front of the case 12.

The device 10 has internal water-tight cylindrical cavities or compartments 26 and 28. Each compartment is sealed with a water-tight lock, 30 and 32. The probe compartment 26 is capable of housing an optional external probe 34 (shown in outline form) which may be utilized as an alternative to the internal measurement counters to be described herein. The external probe contains an alpha-beta gamma measurement counter. As will be described, other measurement probes, such as telescopic probes, liquid monitoring probes, large-area contamination probes and scintillation probes, may be utilized with the device 10. A probe connector 36 extends outward from the case 12. The connector will receive a cable 38 which in turn may be connected to one of a variety of different probes for radiation measurement.

While the preferred embodiment described herein contains the probe compartment 26, it should be understood that the external probe 34 is an optional feature.

The other compartment 28 houses batteries 40 to provide a power supply for the device. The batteries are shown in outline form in FIG. 1.

FIG. 2 shows a side view and FIG. 3 shows a top view of the device 10.

FIG. 4 shows a block diagram of the device 10. Two Geiger-Müller counters 42 and 44, of different sensitivity, provide high and low dosage response. A central processing unit microprocessor 46, selectively activates either of the Geiger-Müller counters, 42 or 44, by selectively activating a high voltage supply 48. Thus, the central processing unit 46 automatically switches between Geiger-Müller counters providing a wide range of measuring ranges. In the present embodiment, the measuring range is from 0.50 micro sieverts per hour (micro Sv/h) to 5 Sv/h. The high voltage supply 48 is powered in one of two ways. The power is supplied from either batteries 40 housed within internal compartment 28 or, alternatively, from an external power supply (not shown) through serial interface connector 50.

As seen in FIGS. 1 and 2, the serial interface connector 50 and the probe connector 36 have caps 51 to protect the connectors when not in use.

Returning to a consideration of FIG. 4, as an alternative to the Geiger-Müller counters 42 and 44 contained within the device, external probes such as the probe 52 may be connected via connector 36. The external probe 52 will provide identification of the type of probe connected by circuit 54. In the probe 52 shown, a pair of Geiger-Müller counters 42' and 44' are utilized. However, other types of measurement devices might be used. When the probe 52 is connected, the internal Geiger-Müller counters 42 and 44 are by-passed.

In order to provide a stable internal time measurement, a quartz oscillator 56 is provided. A watch dog, self-checking circuit 58 provides continuous self-checking and guards against component malfunction.

In operation, the signal voltage received form the operational Geiger-Müller counters, 42 or 44, is fed to pulse shaping devices 60 and 62, respectively. Each pulse shaping device is connected to a high speed counter 64 which is in turn connected to the central processing unit 46. The high speed counter keeps track of the pulses delivered by the Geiger-Müller counter tubes during fixed time sampling periods. Every second the number of accumulated pulses, the count rate per second, is read by the central processing unit microprocessor and then the counter is restarted.

A measurement algorithm, to be described in detail, is programmed and stored in unchanging storage 66. The central processing unit 46 maintains and updates internal tables in a random access memory 68.

A multifunction input-output chip 70 interfaces with the liquid crystal display 14 as well as the scale illumination switch 20 and the acoustic pulse signaling switch 18. Acoustic beeper 72 is also connected to the input-output chip 70. Control of the high voltage supply 48 is also accomplished by the input-output chip 70.

The serial interface connector 50 extending from the case is provided in order to connect the device 10 to an external power supply or to an external computer (not shown).

An additional circuit (not shown in the drawings) monitors the current through the Geiger-Müller counters 42 and 44 and activates an overflow warning signal if the current exceeds a certain threshold.

Based on the measurement algorithm to be described, a display value is generated derived from the counter value of the high speed counter 64 in conjunction with the appropriate state and calibration tables contained in the random access memory 68. The RAM tables contain information for each measurement range that controls the actual processing of the pulse generated from the Geiger-Müller counters. The RAM tables also contain calibration information to convert the averaged count value to technical radiation units in sieverts/h.

Figure 5:
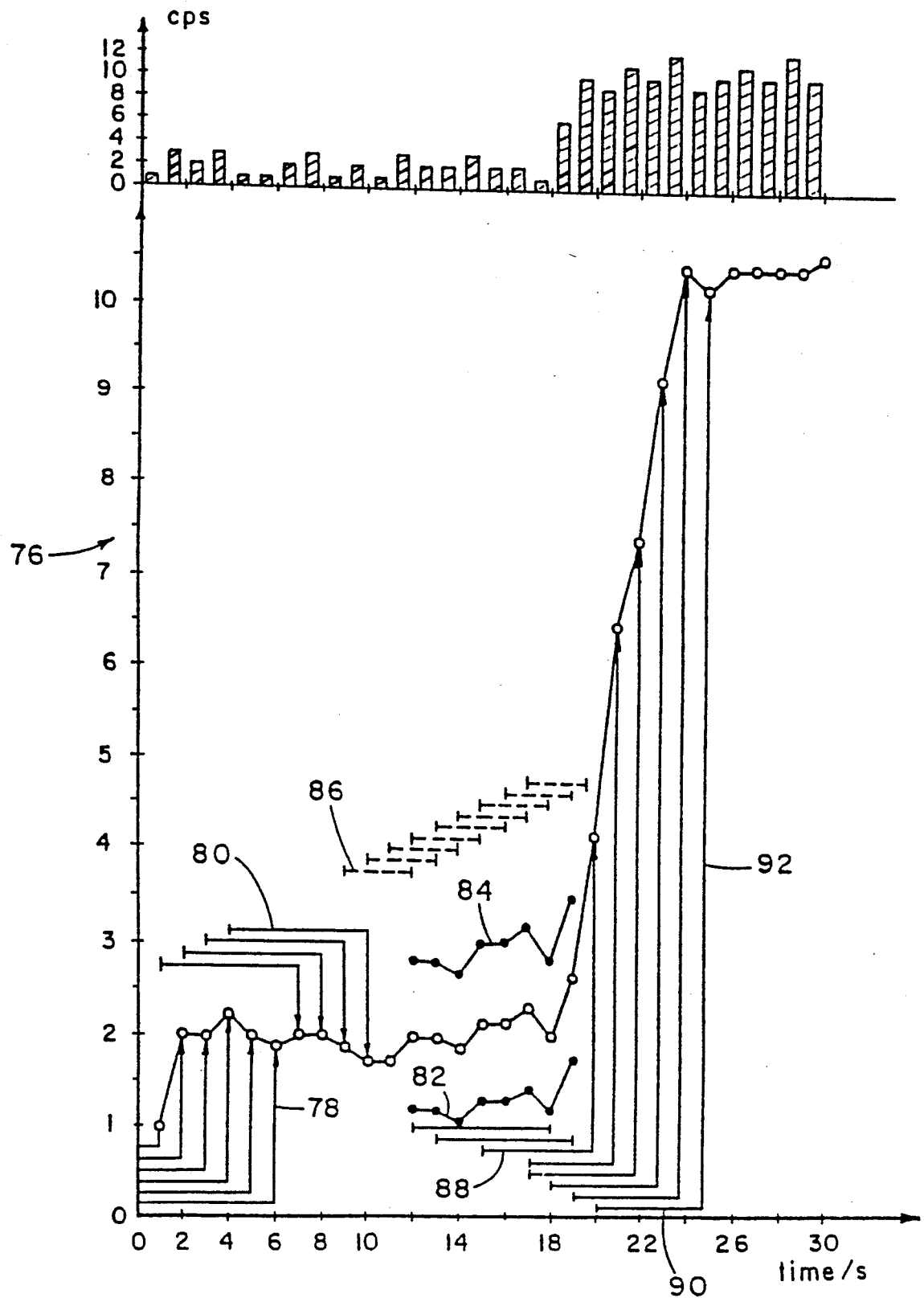
FIG. 5 is a pair of graphs illustrating operation of the radiation measurement device shown in FIG. 1 indicating hypothetical radiation readings.

Referring to FIG. 5, a pair of graphs 76 illustrate the measurement algorithms and the operation of the device 10 for a hypothetical radiation reading. The measurement algorithm allows for the random or stochastic nature of radiation and adapts itself to the statistical requirements of the particular dose rate. Three distinct operational states are shown: start up, steady state and step response.

The upper graph in FIG. 5 gives the actual counter values in counts per second on the y ordinate versus the time on the x ordinate. Initially, the radiation averages about two counts per second stepping up to approximately ten counts per second after 18 seconds.

The lower graph of FIG. 5 shows the averaged counts per second value after processing by the instrument logic. The resulting value is derived from converting the counts per second average to technical units based on conversion tables for Geiger-Müller tubes which are incorporated in the random access memory 68. Starting from 0 (zero) seconds, the ordinate at the left hand margin indicates power up of the device 10. The start-up time is approximately two seconds. After power up and associated self tests or diagnosis, the measurement algorithm operates and expands the integration time up to a specific maximum dependent on the current mean value. The bars 78 below the curve of resultant counts per second average values show the increasing length of the integration interval. Each second a new mean value is calculated abased on the current integration interval. This information is converted to sieverts/h (Sv/h) and then displayed on the liquid crystal display 14. The integration intervals in the steady state operation are of fixed length, continuously shifted to provide the most current values as indicated by bars 80 above the curve.

In the event of a dramatic change in radiation, and to ensure quick response, two features are employed. An adaptive threshold setting allows for small, statistical fluctuations of the long term mean value and is illustrated by curves 82 and 84 below and above the curve of counts per second average values. Additionally, a comparatively short, internal check interval reflects short term variation and is illustrated by dashed lines 86. As long as the measurement value generated on the basis of the short check interval stays within the currently set threshold, as shown by curves 82 and 84, steady state operation is assumed. This guarantees long integration times even at highly fluctuating low dose rates.

A sudden change in radiation, shown after 18 seconds on the graphs 76, has a dramatic effect on the value derived form the check interval. In response to such a change, the main integration time 88 shrinks back, thus assigning more weight to the most recently measured counter values. The degree of shrinking of the main integration interval and the short check interval is coupled to the dose rate evaluation.

In the example shown in the graphs 76, the upward change in radiation was rather small and steady state characteristics are quickly reestablished. This leads to a new expansion of the main integration interval 90 in order to stabilize the resultant display. A maximum integration time (up to 240 seconds) is selected for the current dose rate reading based on optimum statistic performance. Similar to start-up conditions, the main integration interval is allowed to expand to this maximum value. Once the maximum integration time is established and steady-state conditions persist, this new fixed interval 92 is shifted to supply the average of the most recent values.

The internal tables for minimum and maximum integration time, threshold setting and short check interval are continuously updated every second. The calculation of the actual displayed value on the display 14 is also executed every second.

The digital readout on the display 14 is based on the evaluation of the main integration interval and is given in Sv/h. The analog readout on the display 14 is shown as a bar graph and is connected to the short check interval to reflect trends in the radiation more easily.

Figure 6:
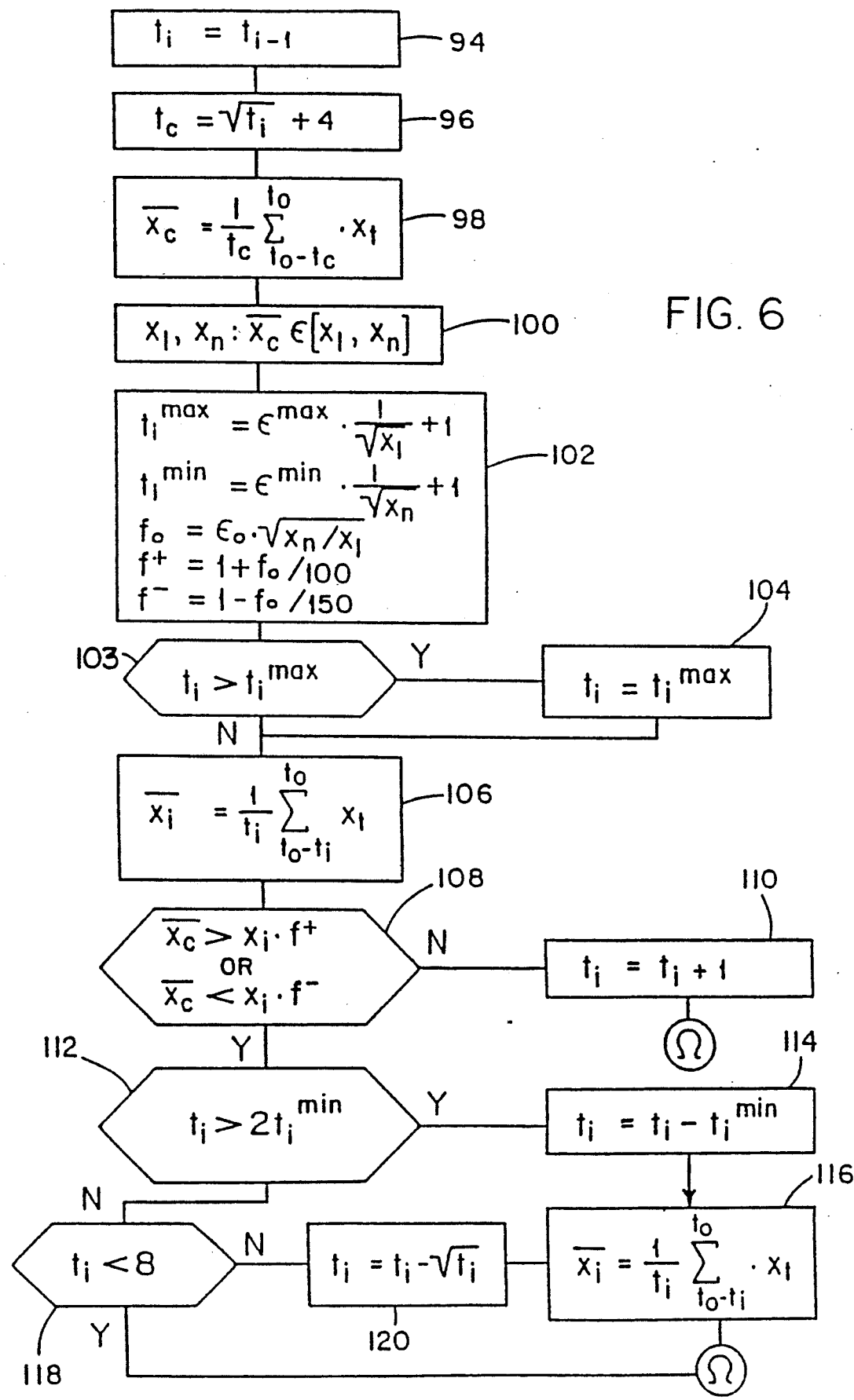
FIG. 6 is a flow chart of the measurement algorithm for the radiation measurement device shown in FIG. 1.

FIG. 6 shows the measurement algorithm for the device which is based on the repetitive evaluation of counts delivered by the Geiger-Müller counter 42 or 44, which is in prior to use of this measurement algorithm.

The flow chart in FIG. 6 indicates the actions performed. Rectangular boxes indicate simple action, such as the assignment of processed values to specific variables. Hexagon shaped boxes indicate decision points of the yes/no type. In the first action 94, the actual integration interval is initialized to the value of the previous integration in $(t_{i-1})$ which is found from the preceding processing of the algorithm. During the first processing, the integration interval is initialized to one second. In the second action 96, a shorter check interval $(t_c)$ is derived from $(t_i)$ by taking the square root and adding a constant. In the third action 98, the check interval is used to calculate a first average of count rates $(\bar{x}_c)$ by considering all counts in an interval of $t_c$ seconds. In the fourth action 100, the average value $\bar{x}_c$, is used to select for current measuring range so that $\bar{x}_c$ falls between the lower $(\bar{x}_1)$ and upper $(\bar{x}_n)$ limit of the interval.

Specific values are assigned to the parameters $t_i$ max and $t_i$ min, the upper and lower limit of the actual integration interval as well as $f+$ and $f-$, the limits of statistical fluctuation for steady state operation in the particular dose rate range. These parameters are selected from tables which are programmed in unchanging storage 66. This calculation is shown in the fifth action 102.

The actual integration interval $t_i$, derived in the first action 94, is now compared against the upper limit $t_i$ max, at 103, and, if it exceeds this value it is reset to this limit as indicated in the Y branch of the sixth action 104. If this value is less, the main average $\bar{x}_i$ is calculated in the seventh action 106 in much the same way as the average is $\bar{x}_c$. The value $\bar{x}_i$ is a preliminary result of the desired average of the measurement values, based on the assumption of steady state operation.

Additional actions will ascertain this assumption or modify the preliminary result as set forth with the eighth action 108. The main average $\bar{x}_i$ is weighted with the upper and lower fluctuation limit factors $f+$ and $f-$, allowing certain tolerance band from fluctuation of the average values. This is particularly critical in the low dosage area. The average $\bar{x}_c$, based on the short check interval $t_c$, is compared against this fluctuation band. If it falls within this range, the assumption of steady state condition is verified (Y branch) with the actual integration interval $t_i$ incremented for the next action 110 and the evaluation algorithm terminates.

If, however, $\bar{x}_c$ does not fall within the above tolerance band (N branch), step response action is performed by shrinking back the integration interval $t_i$ to assign more weight to the most recently measured values.

In the next action 112, the actual integration interval $t_i$ is compared against twice the lower limit $t_i$ min. If $t_i$ is still greater than twice the lower limit (Y branch), the actual integration interval is decreased by this lower limit in action 114 and the main average $\bar{x}_i$ is recalculated in action 116. If integration interval $t_i$ is between a fixed minimum value of eight seconds, shown in action 118, and twice its lower limit (N branch), the actual integration interval $t_i$ is decreased by its square root in action 120 and the main average $\bar{x}_1$ is recalculated in action 116. The Y branch of action 118 discloses a phase of very fast step response, where the integration interval has already reached a minimum value and no further decreasing is allowed.

The final result of the measurement algorithm is the main average $\bar{x}_1$ of measured count rates, calculated over the integration interval $t_i$. This value is converted via the calibration tables in unchanging storage 66 to technical units of Sv/h. This value is displayed as the digital value in the display 14.

The analog bar in display 14 is derived from average $\bar{x}_c$ based on the integration time $t_c$. This value is more sensitive to changes in radiation intensity and facilitates for recognition of trends in a radiation field.

The final result of the algorithm is the actual integration interval $t_i$ which is then fed as the starting value in action 94 into the next processing sequence of the measurement algorithm.

Whereas the present invention has been described in particular relation to the drawings attached hereto, it should be understood that other and further modifications apart from those shown or suggested herein may be made within the spirit and scope of this invention.

We claim:

1. A method of measuring radiation for a radiation measurement device with at least two Geiger-Müller counter tubes of different sensitivity, high voltage supply means in connection with each of said Geiger-Müller counter tubes and microprocessor means including program storage means and random access memory means capable of switching between said Geiger-Müller counter tubes based on said radiation intensity whereby at least one Geiger-Müller counter tube generates pulses wherein an actual integration interval ($t_1$) is determined by a measurement algorithm, said method comprising the steps of:

setting the actual integration interval ($t_i$) to the value of the previous integration interval ($t_{i-1}$) or to a fixed value at start up;

retrieving a check interval ($t_c$) from the actual integration interval ($t_i$), by taking the square root of the actual integration interval and adding a constant;

calculating the average of the Geiger-Müller counter pulses ($\bar{x}_c$) for the check interval of time ($t_c$);

selecting a specific measuring range and specific values for parameters of the algorithm according to the average ($\bar{x}_c$), said values being the upper ($t_i$ max) and the lower ($t_i$ min) limit for the actual integration interval ($t_i$) and the upper and lower limit for the allowed statistical fluctuation of the radiation intensity in said measuring range;

comparing the actual integration interval ($t_i$) to the upper limit ($t_i$ max);

determining whether the actual integration interval falls below or above the upper limit for the actual integration interval ($t_i$ max);

setting the integration interval to the upper limit ($t_i$ max) if it was above the limit and letting the integration interval remain unchanged if it was less than or equal to the limit;

calculating the average value ($\bar{x}_i$) of the counter Geiger-üller pulses during the actual integration interval;

determining a tolerance band by weighting said average value ($\bar{x}_i$) with the given values of the upper and lower limit of the statistical fluctuation; and using the average value ($\bar{x}_1$) of the counter pulses for calculation of the dose rate if the average ($\bar{x}_c$) falls within said tolerance band and incrementing the actual integration interval ($t_i$) or shortening the actual integration interval ($t_i$) if the average ($\bar{x}_c$) falls outside the tolerance band and using said shortened integration interval for calculation of the dose rate value by comparing the actual integration interval ($t_i$) against twice the lower limit for the actual integration interval ($t_i$ min) so that if the actual integration interval ($t_i$) is greater than twice the lower limit for the actual integration interval, it is decreased by the lower limit for the actual integration interval and if the actual integration interval is between a fixed minimum value and twice its lower limit, the actual integration interval is decreased by its square root, so that the average value ($\bar{x}_i$) of count rates may be calculated.

2. A method according to claim 1, further comprising the step of continuously updating every second the internal tables for minimum and maximum integration time, threshold setting and short check interval.

3. A method according to claim 1, further comprising the step of assigning specific values to the parameters ($t_i$ max and $t_i$ min), the upper and lower limit of the actual integration interval, as well as to (f+) and (f−), the limits of statistical fluctuation for steady state operation in the particular dose rate range, wherein these parameters are selected from tables which are programmed in unchanging storage means.

4. A method according to claim 2, further comprising the step of assigning specific values to the parameters ($t_i$ max and $t_i$ min), the upper and lower limit of the actual integration interval, as well as to (f+) and (f−), the limits of statistical fluctuation for steady state operation in the particular dose rate range, wherein these parameters are selected from tables which are programmed in unchanging storage means.

* * * * *